US012110836B2

(12) United States Patent
De Lise

(10) Patent No.: US 12,110,836 B2
(45) Date of Patent: Oct. 8, 2024

(54) ENGINE CYLINDER WITH LINER

(71) Applicant: DeltaHawk Engines, Inc., Racine, WI (US)

(72) Inventor: Matthew Daniel De Lise, Brookfield, WI (US)

(73) Assignee: DeltaHawk Engines, Inc., Racine, WI (US)

( * ) Notice: Subject to any disclaimer, the term of this patent is extended or adjusted under 35 U.S.C. 154(b) by 0 days.

(21) Appl. No.: 18/337,844

(22) Filed: Jun. 20, 2023

(65) Prior Publication Data

US 2024/0060457 A1 Feb. 22, 2024

Related U.S. Application Data

(63) Continuation of application No. 17/889,789, filed on Aug. 17, 2022, now Pat. No. 11,719,182.

(51) Int. Cl.
*F02F 1/00* (2006.01)
*F02B 75/02* (2006.01)
*F02B 75/22* (2006.01)

(52) U.S. Cl.
CPC .............. *F02F 1/004* (2013.01); *F02B 75/02* (2013.01); *F02B 75/22* (2013.01); *F02B 2075/025* (2013.01)

(58) Field of Classification Search
CPC ..... F02F 1/004; F02F 11/005; F02B 2275/30; F16J 10/04
USPC ....................................................... 123/193.2
See application file for complete search history.

(56) References Cited

U.S. PATENT DOCUMENTS 2,436,043 A * 2/1948 Herreshoff .............. F02B 75/22 123/41.77
2,442,917 A * 6/1948 Butterfield ................ F16C 9/02 74/606 R
3,385,273 A * 5/1968 Baster ........................ F02F 1/14 123/41.82 R
3,581,631 A 6/1971 Samson
3,851,631 A * 12/1974 Kiekhaefer ............. F02F 1/002 123/193.6
6,164,260 A * 12/2000 Bock ........................ F02F 1/163 123/193.2
6,279,550 B1 * 8/2001 Bryant .................... F02B 33/26 123/316
6,446,592 B1 * 9/2002 Wilksch .................. F02B 39/14 123/196 R
7,191,770 B1 * 3/2007 Anderson ............... F02F 1/004 123/669
9,850,846 B1 12/2017 Qin
2003/0010866 A1 * 1/2003 Wilksch ................. B64D 27/04 244/54
2008/0264361 A1 * 10/2008 Hashimoto ........... F01L 13/085 123/90.1
2016/0053707 A1 * 2/2016 Batta ...................... F02F 11/005 123/193.2

(Continued)

*Primary Examiner* — Long T Tran
*Assistant Examiner* — James J Kim
(74) *Attorney, Agent, or Firm* — Reinhart Boerner Van Deuren s.c.

(57) ABSTRACT

An engine is provided with a cylinder liner that extends beyond the surface of the crankcase surrounding the cylinder. When the engine is oriented in an inverted V-block configuration, the extension of the cylinder liner provides a barrier to oil that can pool on the crankcase surface and otherwise enter the interior of the cylinder, absent such a barrier.

19 Claims, 6 Drawing Sheets

(56) References Cited

U.S. PATENT DOCUMENTS

| | | | | |
|---|---|---|---|---|
| 2016/0053711 | A1* | 2/2016 | Batta | F02F 1/16 123/41.79 |
| 2017/0226958 | A1* | 8/2017 | Cline | F02F 1/004 |
| 2018/0306099 | A1* | 10/2018 | Suzuki | F02F 11/00 |
| 2018/0347505 | A1 | 12/2018 | Luick et al. | |
| 2021/0138593 | A1* | 5/2021 | Guisasola | B23P 19/043 |

* cited by examiner

ENGINE CYLINDER WITH LINER

CROSS-REFERENCE TO RELATED PATENT APPLICATION

This application is a continuation of U.S. application Ser. No. 17/889,789, filed on Aug. 17, 2022, which is incorporated herein by reference in its entirety.

BACKGROUND OF THE INVENTION

The present invention relates generally to the field of engines. The present invention relates specifically to an oil diverting cylinder liner for use with an inverted V-block engine.

SUMMARY OF THE INVENTION

One embodiment of the invention relates to an inverted V-block, two-stroke engine that includes a cylinder, a crankcase, and a liner. The cylinder forms a cylindrical opening having a central axis. The cylinder has an upper end and a lower end that is opposite the upper end along the central axis. The crankcase has a crankcase surface that surrounds the cylindrical opening at the upper end of the cylinder. The liner is positioned within the cylindrical opening and has a cylindrical shape. The liner protrudes beyond the crankcase surface in an upward axial direction at the upper end of the cylinder.

Another embodiment of the invention relates to an inverted V-block, two-stroke engine that includes a cylinder. The cylinder has an interior surface that defines a cylindrical opening having a central axis. Additionally, the cylinder has an upper end and a lower end that is opposite the upper end along the central axis. A cylindrical liner is coupled to the interior surface of the cylinder. The cylindrical liner is formed of ductile iron. Further, the cylindrical liner has an upper edge that is positioned above the upper end of the cylinder in an upward axial direction.

Another embodiment of the invention relates to an inverted V-block, two-stroke engine that includes a crankcase, a cylinder, and a liner. The cylinder has an interior surface that forms a cylindrical shape defining a cylinder central axis, an upper end, and a lower end that is opposite the upper end along the cylinder central axis. The liner has a cylindrical shape defining a liner central axis. The liner is positioned within the cylinder such that the liner central axis aligns with the cylinder central axis. The cylinder extends from the crankcase in a downward axial direction. The interior surface of the cylinder extends from the upper end of the cylinder to the lower end of the cylinder. The upper end of the cylinder at least in part defines a surface of the crankcase. Further, the liner protrudes beyond the surface of the crankcase in an upward axial direction opposite the downward axial direction.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Figure 1:
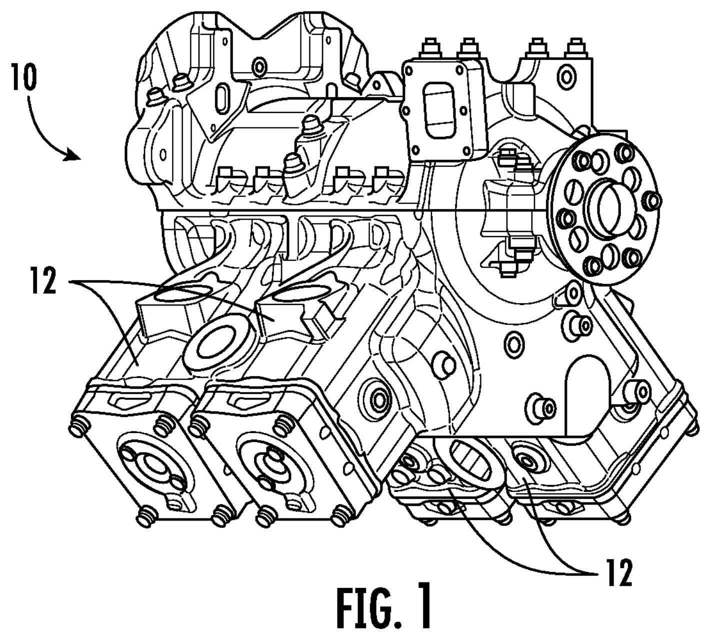
FIG. 1 is a perspective view from above of a two-stroke engine in an inverted V-block orientation, according to an exemplary embodiment.

Referring to FIGS. 1-9, various embodiments of a cylinder for a two-stroke engine are shown. The cylinder includes a liner that extends beyond a surface of the crankcase at the upper end of the cylinder. As shown in FIG. 1, engine 10 is a two-stroke engine that is oriented in an inverted V-block configuration, otherwise known as an A-block configuration. Conventional V-block engine configurations include an engine block having cylinders positioned on an upper or top side of the engine that extend in a generally upward direction. In contrast to a conventional V-block engine, the inverted V-block engine shown includes cylinders that are positioned on a lower or bottom side of the engine and extend in a generally downward direction. Applicant has found that this orientation provides improved visibility when used with certain vehicles. For example, when engine 10 is mounted with a propeller in an aircraft, the pilot is better able to see around engine 10, since cylinders 12 that would otherwise obstruct visibility are located further away from the pilot's line of sight.

In the inverted V-block configuration, the crankcase is now located above, rather than below, cylinders 12. As such, the inverted V-block configuration presents a gravitational leak path for oil when the engine is shut down, allowing oil to migrate from the crankcase to the cylinder ports and out into the airbox of the engine or down into the combustion chamber of cylinder 12. To mitigate the issue of static oil migration in an inverted engine, such as engine 10, with respect to each cylinder 12, Applicant has found it beneficial to extend the cylinder liner against which the piston rings run to protrude beyond the surface of the crankcase surrounding each cylinder 12. In this configuration, the liner additionally serves to provide a barrier against oil dripping along the crankcase surface, reducing the amount of oil that is allowed to enter each cylinder 12. Though FIGS. 1-9 depict views of an inverted V-block configuration, Applicant has also found the disclosed liner to provide a similar barrier in engines having other inverted configurations, such as an inverted inline configuration or an inverted slant configuration.

Static oil migration, apart from generating wasted oil, can also result in engine performance issues. For example, excessive static oil migration to the combustion chamber can cause the engine to hydrolock at startup, which can bend engine connecting rods and severely damage the engine. The issue of hydrolocking is particularly problematic within the aviation industry, where inverted engines are most common, as restarting a hydrolocked aircraft engine often requires a complicated procedure administered by a technician. Further, excessive oil migration to the airbox can fill the airbox with oil, leading to static oil consumption, specifically, to oil being drawn from the airbox into the combustion chamber upon startup and being expelled through the exhaust in an uncontrolled manner.

Referring to FIGS. 2-9, various views are shown of one of the four cylinders 12 of engine 10. Cylinder 12 defines an opening 7, which defines a cylindrical shape that extends through cylinder 12. An upper end of opening 7 opens into a crankcase 9, such that a surface 16 of crankcase 9 surrounds the opening 7 of cylinder 12. In other words, opening 7 is a cylindrical opening and an upper end of opening 7 forms a circular shape in surface 16 of crankcase 9. Further, opening 7 defines a cylinder central axis 11. A liner 14 is positioned within cylinder 12, specifically within opening 7. Liner 14 has a cylindrical shape. In other words, liner 14 is a cylindrical liner. As shown in FIGS. 2-9, liner 14 extends beyond cylinder 12 into crankcase 9. More specifically, liner 14 protrudes beyond surface 16 of crankcase 9 when positioned in cylinder 12.

Figure 4:
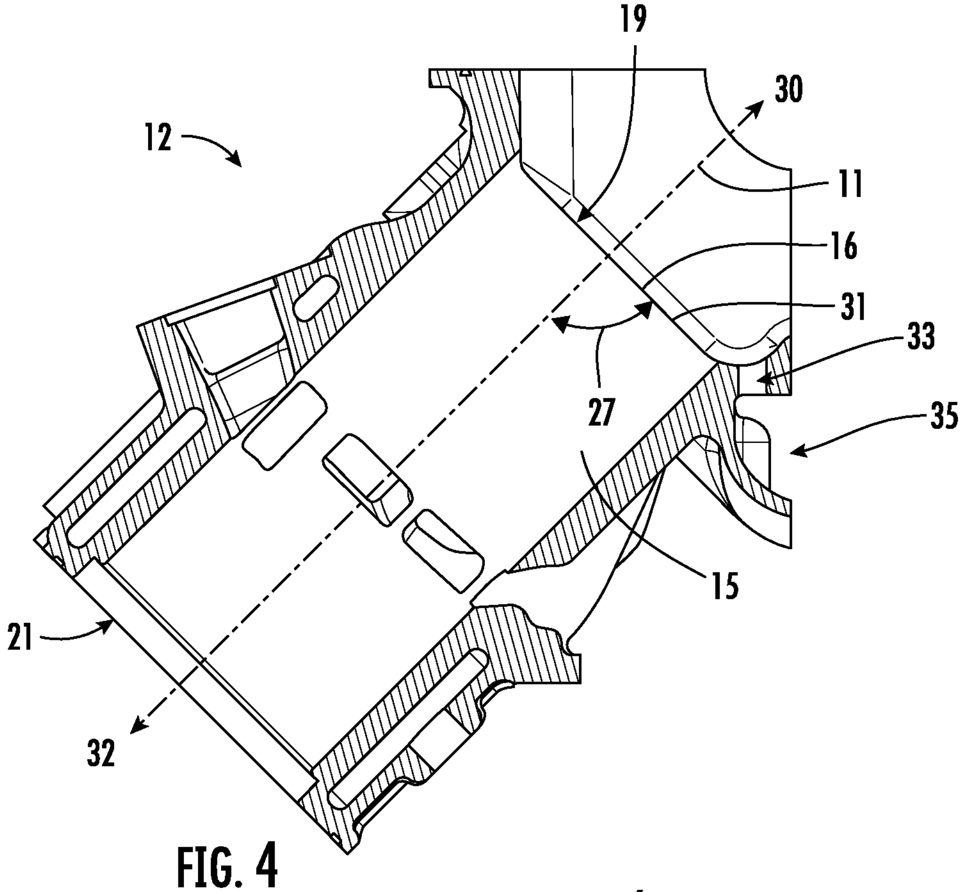
FIG. 4 is a cross sectional view of the cylinder shown in FIG. 3, taken along line A-A, according to an exemplary embodiment.
Figure 5:
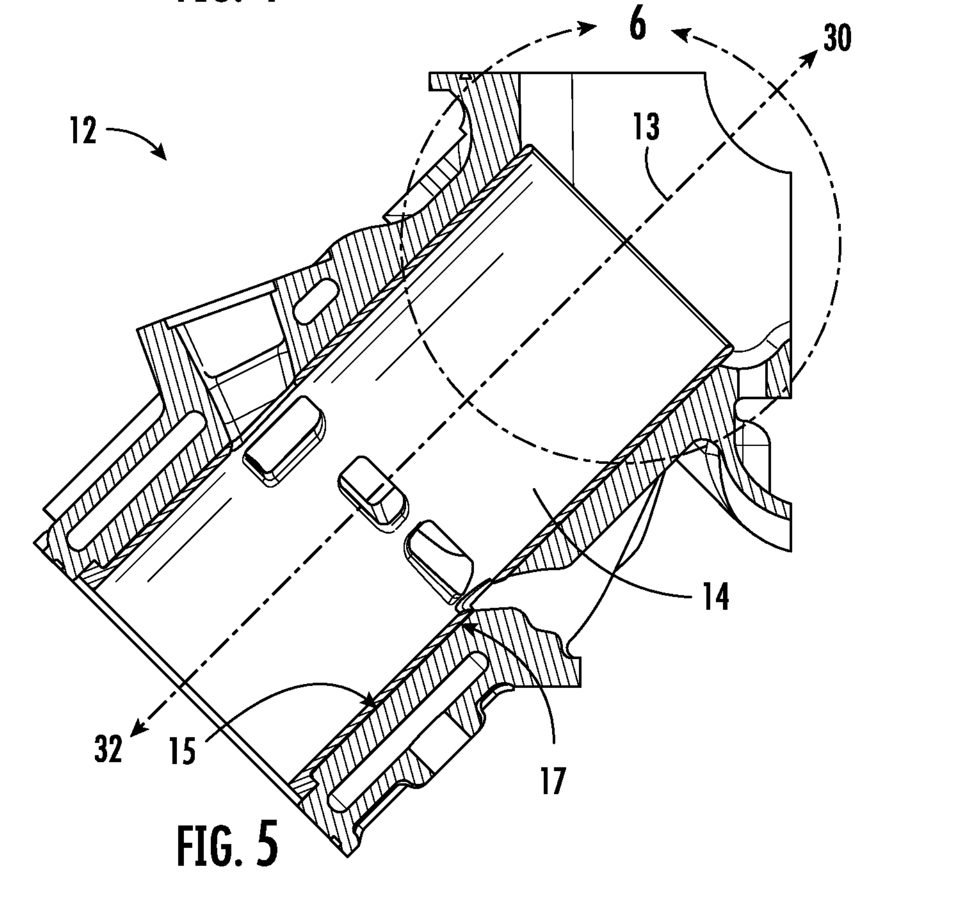
FIG. 5 is a cross sectional view of the cylinder and liner shown in FIG. 3, taken along line A-A, according to an exemplary embodiment.
Figure 6:
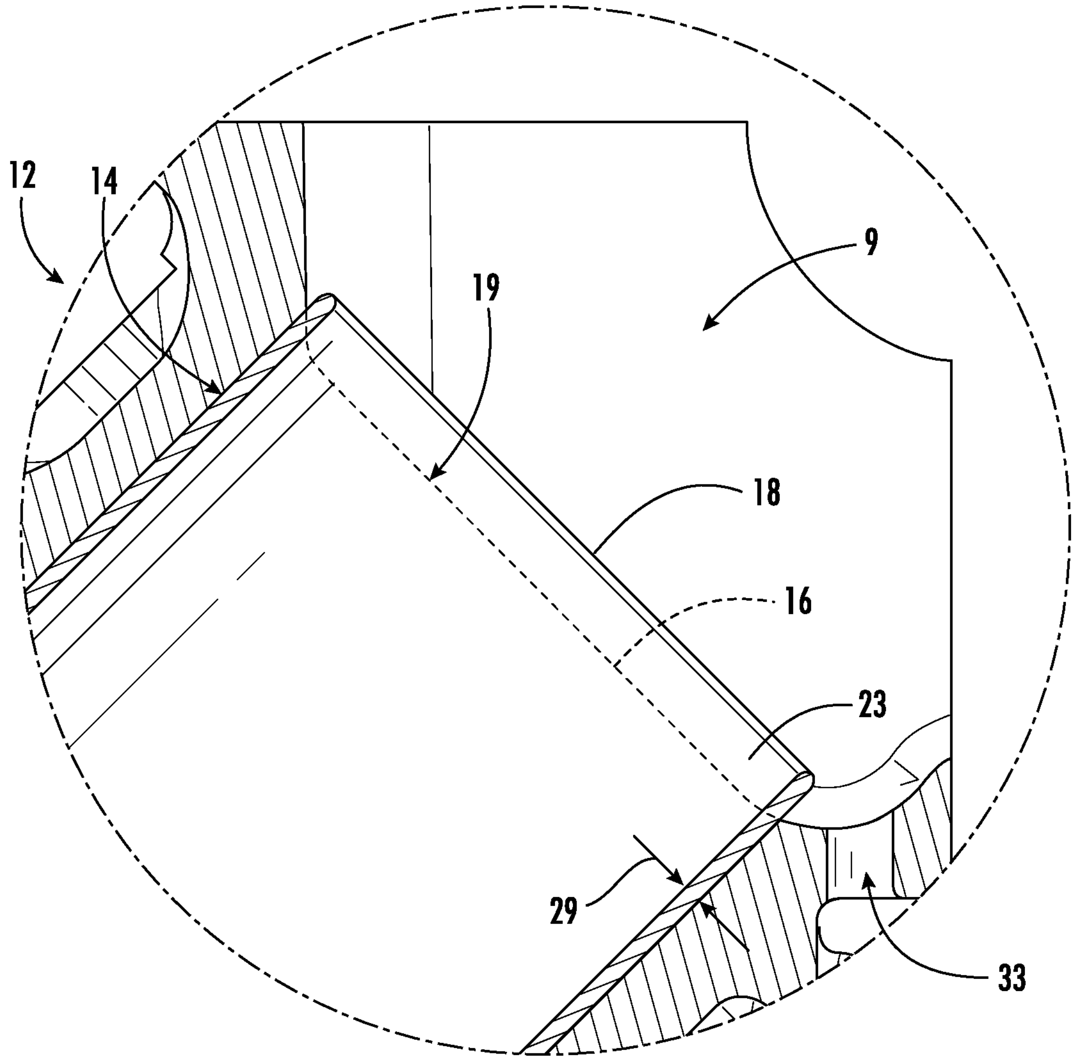
FIG. 6 is a detailed view of the cylinder and liner shown in FIG. 5 at an upper end of the cylinder, according to an exemplary embodiment.
Figure 7:
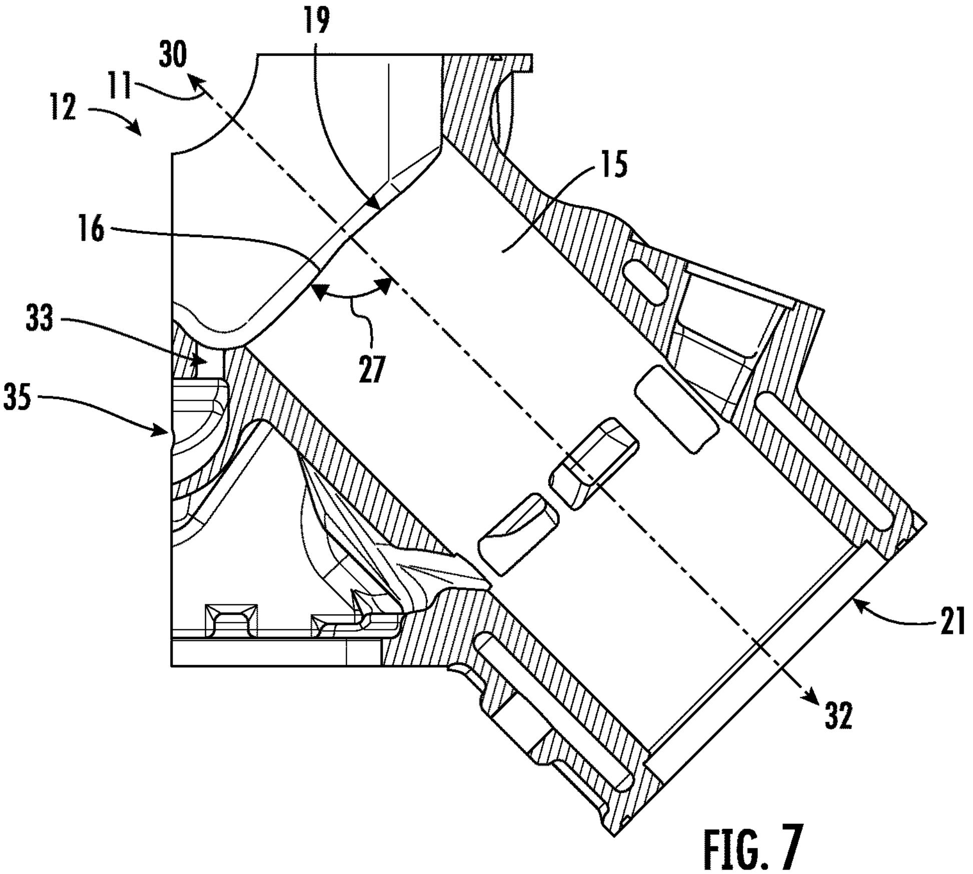
FIG. 7 is a cross sectional view of the cylinder shown in FIG. 3, taken along line B-B, according to an exemplary embodiment.
Figure 8:
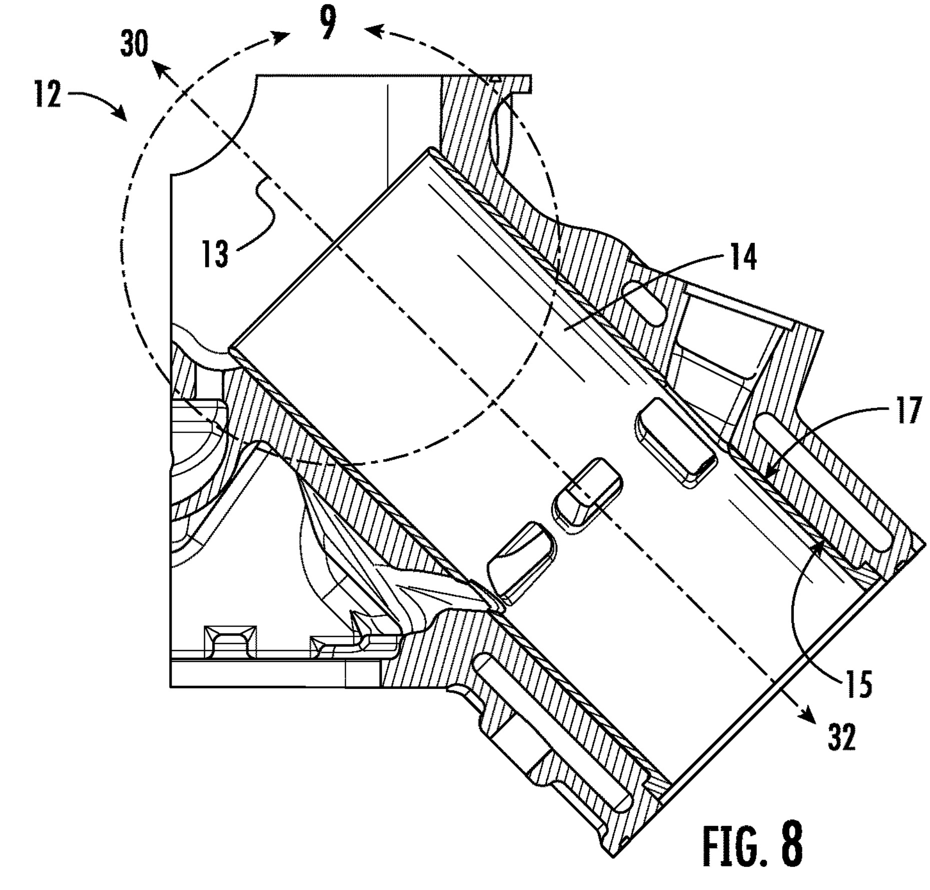
FIG. 8 is a cross sectional view of the cylinder and liner shown in FIG. 3, taken along line B-B, according to an exemplary embodiment.
Figure 9:
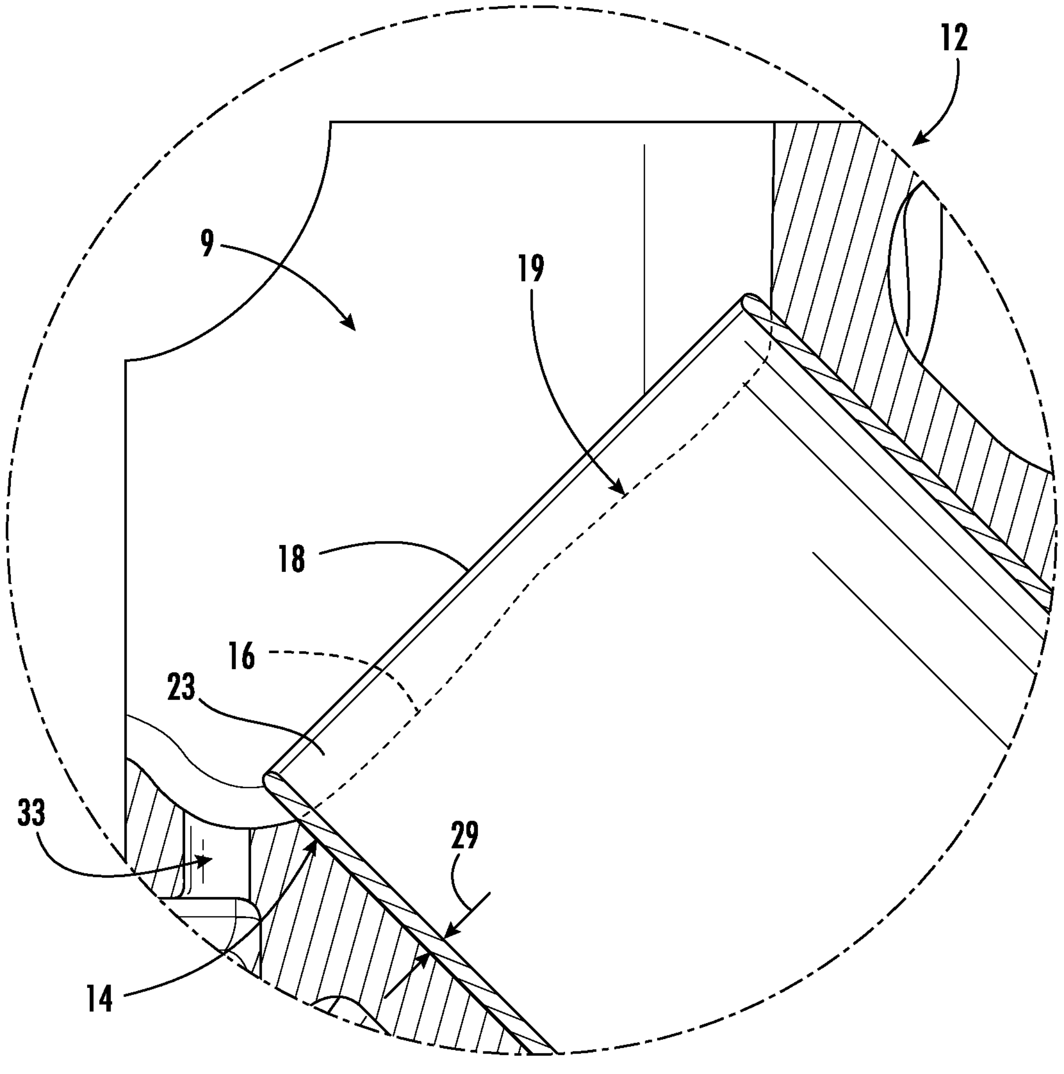
FIG. 9 is a detailed view of the cylinder and liner shown in FIG. 8 at an upper end of the cylinder, according to an exemplary embodiment.

FIGS. 4-6 show a first cross section of cylinder 12, while FIGS. 7-9 show a second, opposite cross section of cylinder 12. Specifically, the views shown in FIGS. 4-6 and the views shown in FIGS. 7-9 are taken from the same cross-sectional plane (shown in FIG. 3) but facing in opposite directions from the cross-sectional plane. Referring to FIGS. 4 and 7, cylinder 12 is shown with liner 14 removed. In specific embodiments, an interior surface 15 of cylinder 12 defines cylindrical opening 7. Specifically, interior surface 15 defines a cylindrical shape having cylinder central axis. In the inverted V-block configuration shown in FIGS. 2-9, cylinder 12 defines an upper end 19 and a lower end 21 that is opposite from upper end 19 along cylinder central axis 11. In specific embodiments, a plane 31, defined by surface 16, is offset from cylinder central axis 11 by an angle 27 of 45 degrees to 90 degrees. In more specific embodiments, plane 31 is oriented perpendicularly to cylinder central axis 11. As such, oil that pools and drips down surface 16 can drip into cylinder 12, absent an external barrier to such oil movement.

Referring to FIGS. 5 and 8, liner 14 is shown positioned within cylinder 12. Liner 14 defines a liner central axis 13, which aligns with cylinder central axis 11 when liner 14 is positioned within cylinder 12. In other words, the cylindrical shape defined by interior surface 15 and the cylindrical shape defined by liner 14 share a common central axis (e.g., cylinder central axis 11 and liner central axis 13 are aligned). In specific embodiments, an outer surface 17 of liner 14 interfaces with interior surface 15 of cylinder 12. In certain specific embodiments, liner 14 is coupled to interior surface 15 via a friction fit, such as a shrink fit.

Figure 2:
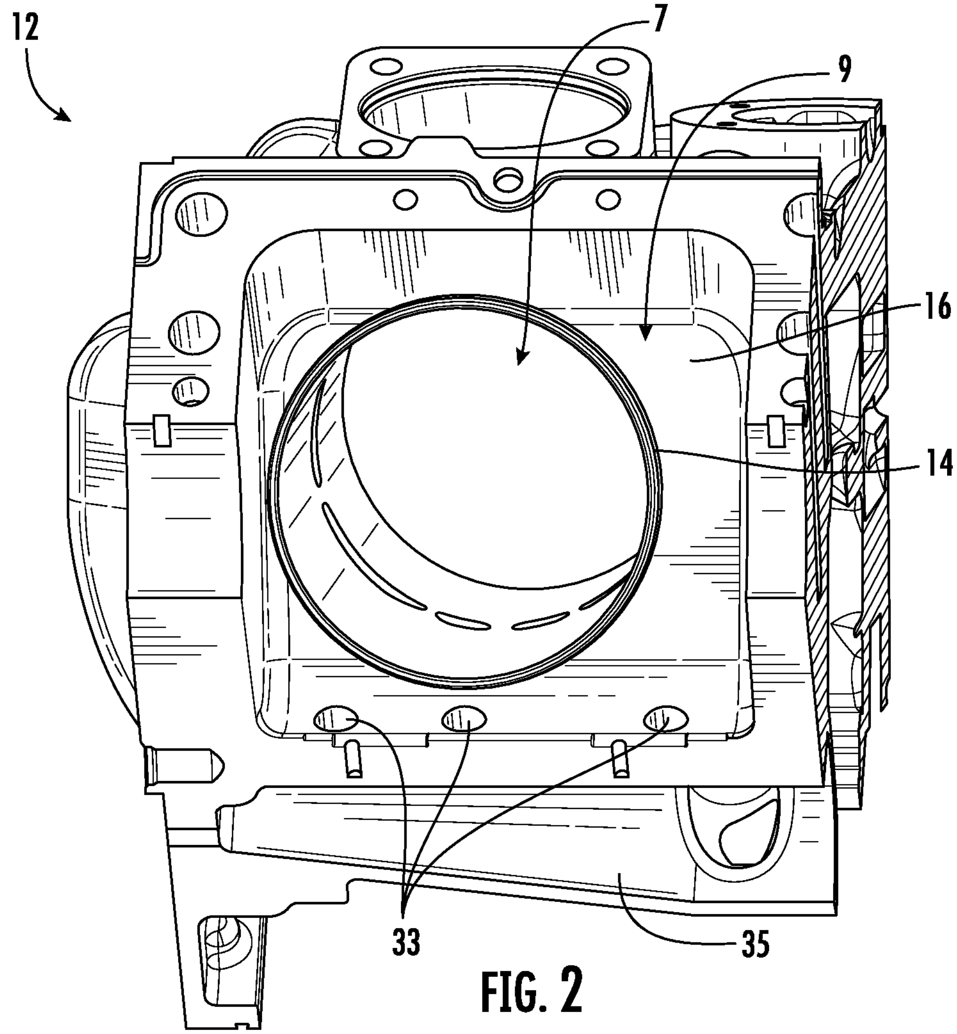
FIG. 2 is a side perspective view from above of a single cylinder of the engine shown in FIG. 1, showing a liner positioned within an interior of the cylinder, according to an exemplary embodiment.
Figure 3:
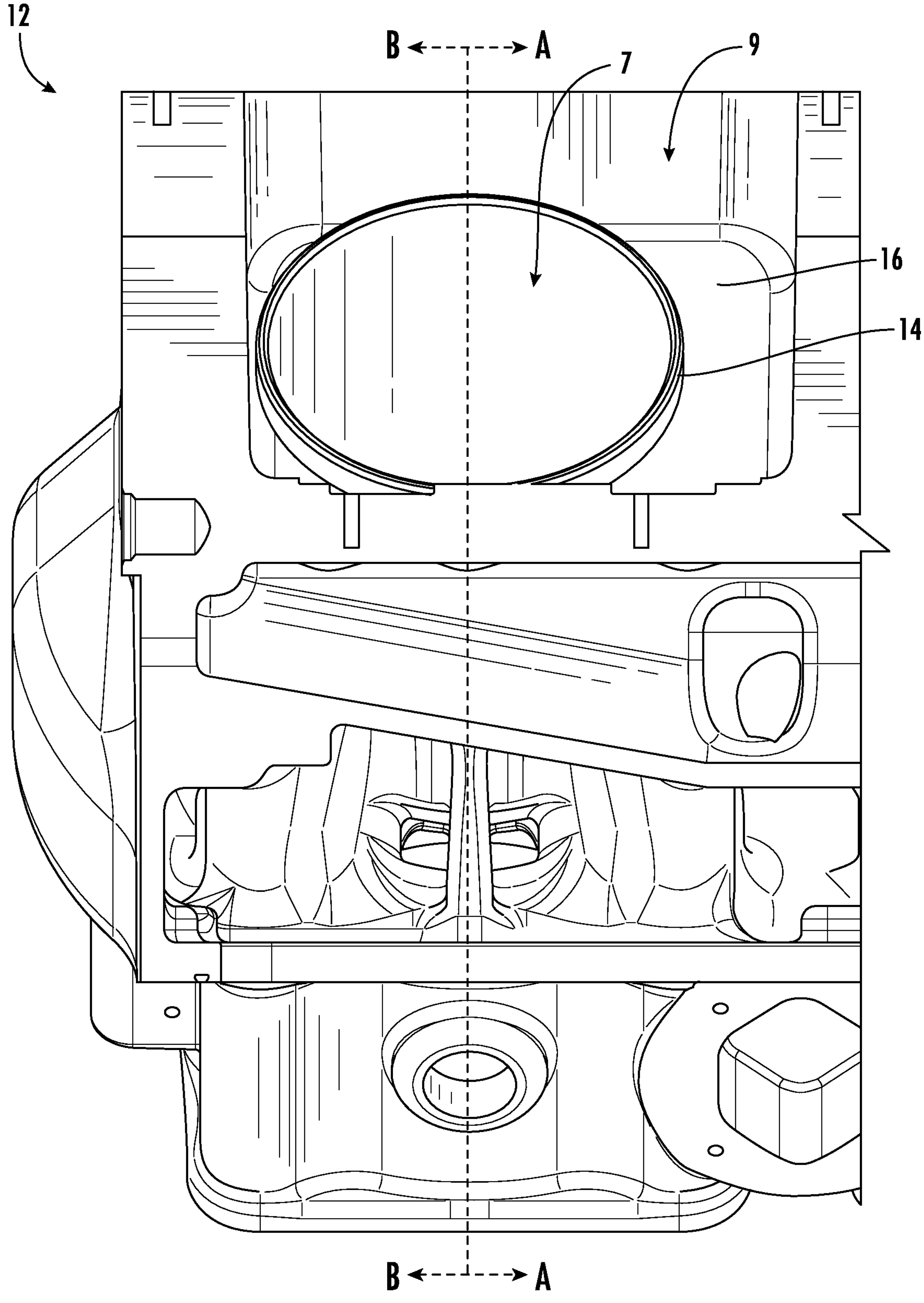
FIG. 3 is another side perspective view from above of the cylinder and liner shown in FIG. 2, according to an exemplary embodiment.

Further, referring to FIGS. 6 and 9, at the upper end 19 of cylinder 12, at least a portion 23 of liner 14 extends beyond surface 16 of crankcase 9. In other words, an upper edge 18 of liner 14 is positioned above surface 16 in an upward axial direction 30. As such, when oil from crankcase 9 begins to pool and drip along surface 16 toward cylinder 12, portion 23 of liner 14 serves as an oil barrier, diverting the oil toward drain holes 33 formed in surface 16 rather than allowing the oil to drip into cylinder 12. Drain holes 33 then drain the oil to an internal scavenging sump 35, shown in greater detail in FIG. 2. As shown in FIG. 2, surface 16 includes three drain holes. In other embodiments, surface 16 may include a different number of drain holes, such as two drain holes.

In specific embodiments, liner 14 extends approximately 0.100-0.330 inches beyond surface 16 in upward axial direction 30. In more specific embodiments, liner 14 extends approximately 0.126-0.226 inches beyond surface 16 in upward axial direction 30. In more specific embodiments, liner 14 extends 0.126 inches beyond surface 16 in upward axial direction 30. In other more specific embodiments, liner 14 extends approximately 0.309-0.311 inches beyond surface 16 in upward axial direction 30. In more specific embodiments, liner 14 extends 0.310 inches beyond surface 16 in upward axial direction 30. In other words, upper edge 18 is located approximately 0.100-0.330 inches from surface 16 in a direction perpendicular of upper edge 18. In more specific embodiments, upper edge 18 is located approximately 0.126-0.226 inches from surface 16 in a direction perpendicular of upper edge 18. In more specific embodiments, upper edge 18 is located 0.126 inches from surface 16 in a direction perpendicular of upper edge 18. In other more specific embodiments, upper edge 18 is located approximately 0.309-0.311 inches from surface 16 in a direction perpendicular of upper edge 18. In more specific embodiments, upper edge 18 is located 0.310 inches from surface 16 in a direction perpendicular of upper edge 18.

Additionally, in specific embodiments, liner 14 has a thickness 29 of approximately 0.22-0.2317 inches. In more specific embodiments, liner 14 has a thickness of 0.226 inches. In certain specific embodiments, liner 14 is formed of ductile iron, such as ductile cast iron. In some specific embodiments, liner 14 does not protrude beyond cylinder 12 at lower end 21 of cylinder 12. In other words, cylinder 12 extends beyond liner 14 in a downward axial direction 32 at lower end 21.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes, and omissions may also be made in the design, operating conditions, and arrangement of the various exemplary embodiments without departing from the scope of the present invention.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An inverted V-block, two-stroke engine comprising:

a cylinder that forms a cylindrical opening having a central axis, the cylinder having an upper end and a lower end that is opposite the upper end along the central axis;

a crankcase having a crankcase surface that surrounds the entirety of the cylindrical opening at the upper end of the cylinder, the crankcase surface extending along a plane from a first side of the crankcase to a second side of the crankcase opposite the first side along the plane, wherein the crankcase surface includes an uninterrupted portion extending from the first side to the second side along the plane, and wherein the plane is oriented at a non-zero angle with respect to the central axis; and a liner positioned within the cylindrical opening, the liner having a cylindrical shape;

wherein the liner protrudes beyond the crankcase surface in an upward axial direction at the upper end of the cylinder.

2. The engine of claim 1, wherein the cylindrical opening is defined by an interior surface of the cylinder, and wherein the liner has an outer surface that interfaces with the interior surface of the cylinder.

3. The engine of claim 2, wherein the liner is coupled to the interior surface of the cylinder via a friction fit.

4. The engine of claim 1, wherein the plane is oriented at an angle of 45 degrees to 90 degrees with respect to the central axis.

5. The engine of claim 1, further comprising a drain hole formed in the crankcase surface along the plane, wherein the liner diverts oil towards the drain hole.

6. The engine of claim 5, wherein the crankcase surface includes a curved portion located above the drain hole to direct oil diverted by the liner to the drain hole.

7. The engine of claim 1, wherein a portion of the liner protrudes beyond the crankcase surface by 0.100 inches to 0.330 inches in the upward axial direction.

8. The engine of claim 1, wherein a portion of the liner protrudes beyond the crankcase surface by 0.126 inches to 0.226 inches in the upward axial direction.

9. The engine of claim 1, wherein the liner is comprised of ductile iron.

10. An inverted V-block, two-stroke engine comprising:

a cylinder having an interior surface that defines a cylindrical opening having a central axis, and the cylinder having an upper end and a lower end that is opposite the upper end along the central axis;

a cylindrical liner coupled to the interior surface of the cylinder, the cylindrical liner comprised of ductile iron, and the cylindrical liner having an upper edge that is positioned above the upper end of the cylinder in an upward axial direction; and a crankcase having a crankcase surface that surrounds the cylindrical opening at the upper end of the cylinder, wherein the crankcase surface extends along a plane from a first side of the crankcase to a second side of the crankcase opposite the first side;

wherein the plane intersects the central axis of the cylinder by an angle; and wherein the crankcase surface includes an uninterrupted portion extending from the first side to the second side along the plane.

11. The engine of claim 10, wherein the angle is 45 degrees to 90 degrees.

12. The engine of claim 10, wherein the plane is oriented perpendicular to the central axis.

13. The engine of claim 10, wherein the lower end of the cylinder extends below the cylindrical liner in a downward axial direction opposite the upward axial direction.

14. An inverted V-block, two-stroke engine comprising:

a crankcase having a crankcase surface that extends along a plane from a first side of the crankcase to a second side of the crankcase opposite the first side along the plane, the crankcase surface including an uninterrupted portion extending from the first side to the second side along the plane;

a cylinder comprising:

an interior surface that forms a cylindrical shape defining a cylinder central axis, the cylinder central axis oriented at an angle with respect to the plane;

an upper end defining a circular opening in the crankcase surface between the first side and the second side;

a lower end that is opposite the upper end along the cylinder central axis; and wherein the cylinder extends from the crankcase in a downward axial direction;

a liner comprising an outer surface that defines a cylindrical shape, the cylindrical shape defining a liner central axis;

wherein the liner is positioned within the cylinder such that the liner central axis aligns with the cylinder central axis;

wherein the liner is positioned within the cylinder such that the outer surface of the liner interfaces with the interior surface of the cylinder; and wherein the liner protrudes through the circular opening and beyond the crankcase surface in an upward axial direction opposite the downward axial direction.

15. The engine of claim 14, wherein the liner extends towards the cylinder central axis by a distance of 0.22 inches to 0.2317 inches.

16. The engine of claim 14, wherein the interior surface extends beyond the liner in the downward axial direction at the lower end of the cylinder.

17. The engine of claim 14, wherein the liner further comprises an upper edge, wherein the upper edge is spaced from the crankcase surface by a distance of at least 0.100 inches in the upward axial direction.

18. The engine of claim 17, wherein the distance is 0.126 inches to 0.226 inches.

19. The engine of claim 17, wherein the distance is 0.300 inches to 0.330 inches.

* * * * *